United States Patent [19]

Fujiwara

[11] Patent Number: 4,847,713
[45] Date of Patent: Jul. 11, 1989

[54] DISC DRIVE ARRANGEMENT

[75] Inventor: Keisuke Fujiwara, Kanagawa, Japan

[73] Assignee: Sony Corporation, Tokyo, Japan

[21] Appl. No.: 162,106

[22] Filed: Feb. 29, 1988

[30] Foreign Application Priority Data

Mar. 25, 1987 [JP] Japan .............................. 62-43776[U]

[51] Int. Cl.⁴ ............................................. G11B 17/04
[52] U.S. Cl. ................................ 360/99.07; 360/99.06
[58] Field of Search ............... 360/99.02, 99.03, 99.06, 360/99.07

[56] References Cited

U.S. PATENT DOCUMENTS 4,722,012 1/1988 Toldi et al. ....................... 360/99.07
4,723,185 2/1988 Maeda ............................... 360/99.07
4,774,608 9/1988 Horiuchi et al. ................. 360/99.07

Primary Examiner—Robert S. Tupper
Attorney, Agent, or Firm—Philip M. Shaw, Jr.

[57] ABSTRACT

A disc drive arrangement of simplified construction for a disc cartridge with a magnetic disc retained therein by an urging member, in which after the disc cartridge with the magnetic disc is loaded on the disc drive arrangement, the up and down movement of the cartridge to the disc drive section, head's contacting with and coming apart from the magnetic disc, and the releasing operation of the urging of the urging member against the disc are carried out at a predetermined timing successively, thus the disc cartridge with the magnetic disc being positively loaded and driven by a simplified arrangement.

6 Claims, 3 Drawing Sheets

DISC DRIVE ARRANGEMENT

BACKGROUND OF THE INVENTION

1. Field of the Invention

The present invention relates to a disc drive arrangement for loading and/or unloading a magnetic disc on and from both surfaces of which an information is recorded and reproduced and which is retained in a disc cartridge.

2. Description of the Prior Art

In order to protect the recording and reproducing surfaces of a magnetic disc from being damaged and also in order to make the magnetic disc easy to handle, there is a known magnetic recording and/or reproducing apparatus onto which a disc retained in a disc cartridge is loaded and then an information is recorded on and reproduced from the disc. U.S. Pat. No. 4,504,879 (Toldi et al.) discloses such a conventional disc drive or loading arrangement and the technical outline thereof follows. According to this disc drive arrangement, a cartridge accommodating therein a magnetic disc is loaded onto the disc drive arrangement, and then the cartridge is horizontally moved above a drive spindle. Under this state, upper and lower magnetic heads are spaced apart in the up-and-down direction with a predetermined distance. As the cartridge is moved, the magnetic heads could be inserted into the cartridge through its window portions. During this operation, the outer peripheral portion of the magnetic disc is faced to the magnetic heads through the windows. When the cartridge arrives above the drive spindle, it is lowered and then the magnetic disc is chucked on the drive spindle. At this state, the lower surface of the magnetic disc contacts with the lower magnetic head. Then, the upper magnetic head is lowered to contact with the upper surface of the magnetic disc. Thus, the magnetic disc is brought to the state that recording and/or reproduction thereof is possible.

As described above, the prior art disc drive arrangement can load the disc while it is retained in the cartridge.

In the above example of the prior art disc drive arrangement, the magnetic disc retained in the cartridge is automatically chucked on the drive spindle and contacted with the magnetic heads at predetermined timings. This conventional disc drive arrangement, however, is not provided with means for releasing the urging of pushing means which urges the disc on one surface side of the cartridge to prevent the magnetic disc from being moved upon non-use. Therefore, the known disc drive arrangement cannot use the disc cartridge having such pushing means but can be applied only to a cartridge with a magnetic disc firmly retained to be rotatable, or pivoted, or pivoted thereto.

OBJECTS AND SUMMARY OF THE INVENTION

Accordingly, it is an object of the present invention to provide an improved disc drive arrangement.

Another object of the present invention is to provide a disc dive arrangement of more simplified construction which can be used to load and/or unload a disc cartridge accommodating therein an urging member, for example, a spring so as to avoid unnecessary movements of a disc therein and give the chucking force upon chucking the disc.

A further object of the present invention is to provide a disc drive arrangement for a disc cartridge by which the chucking of a disc retained in the disc cartridge, the contacting of a head with the disc, and the releasing of the urging member's urging can be carried out by one series of operations at a predetermined timing.

Still a further object of the present invention is to provide a disc drive arrangement which is made easier to handle.

According to an aspect of the present invention, there is provided a disc drive arrangement for a disc rotatably retained in a cartridge, said cartridge having a head opening through which is inserted a magnetic head, a central opening through which is inserted a spindle and locking means for locking said disc upon non-use, said disc drive arrangement comprising:

(a) cartridge holder means for holding said cartridge;

(b) movable member means which will be slid by drive means after said cartridge is inserted into said cartridge holder means;

(c) holder moving means provided on said movable member means and for moving said cartridge holder means upwardly and/or downwardly;

(d) head moving means for moving said head upwardly and/or downwardly relative to said disc; and (e) disc lock releasing means responding to said movable member means to release said locking means of said disc, wherein while said movable member means is slid by said drive means, upward and/or downward movements of said cartridge, upward and/or downward movements of said magnetic head and the releasing and/or locking of said disc locking means are carried out at a predetermined timing successively.

These and other objects, features and advantages of the present invention will become apparent from the following description of the illustrative embodiment to be taken in conjunction with the accompanying drawings, throughout which like references identify the same or similar parts.

DETAILED DESCRIPTION OF THE PREFERRED EMBODIMENT

Now, an embodiment of a disc drive arrangement according to the present invention will hereinafter be described with reference to the attached drawings.

Figure 1:
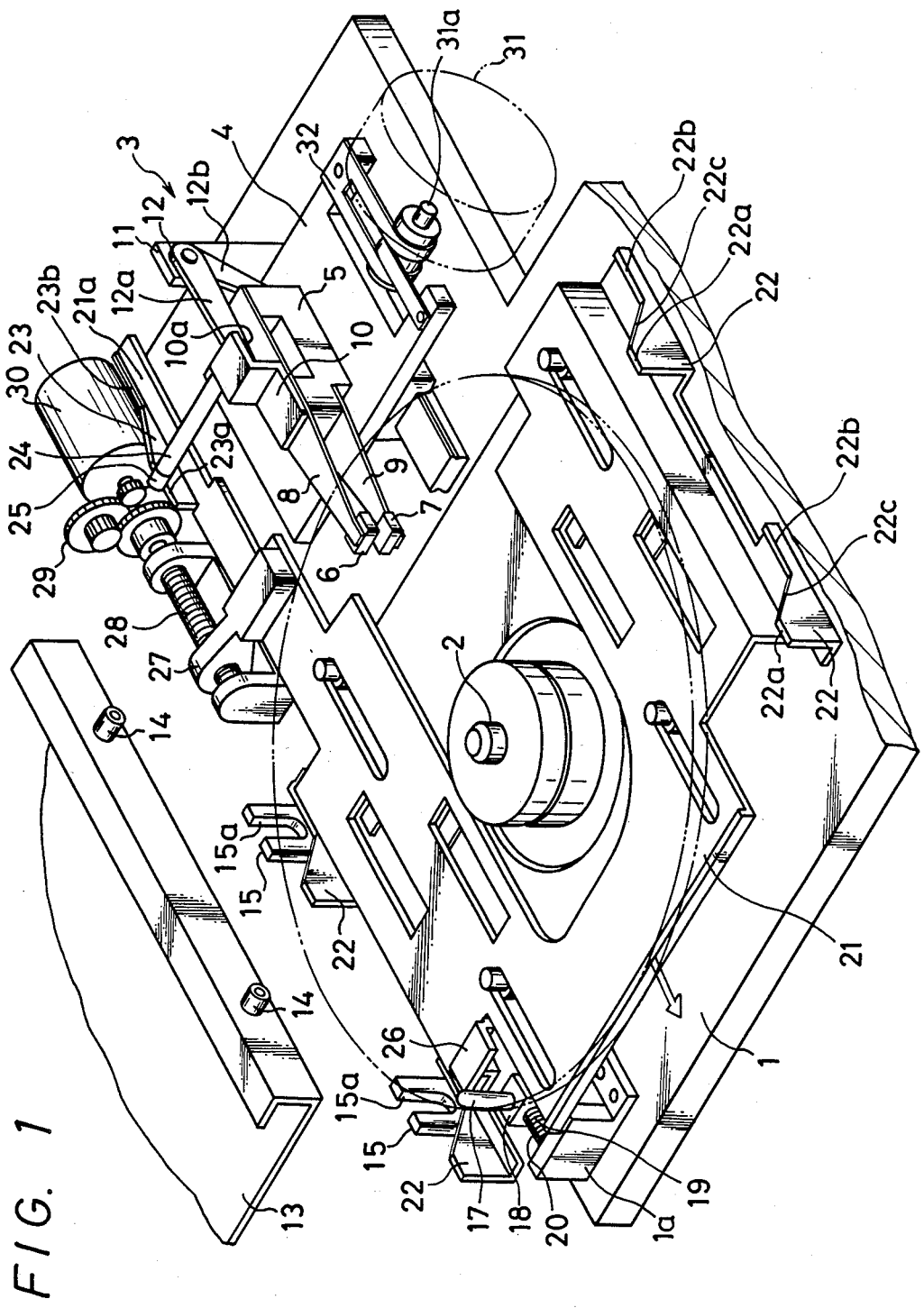
FIG. 1 is a perspective view of an embodiment of a disc drive arrangement according to the present invention.
Figure 2:
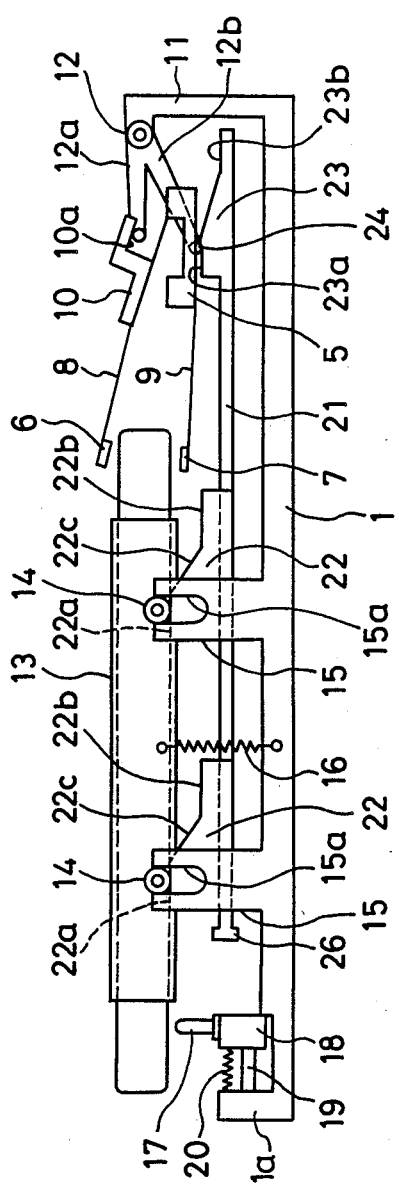
FIGS. 2 and 3 are respectively schematic side views of FIG. 1 at different states used to explain the operation of the disc drive arrangement of the invention.
Figure 3:
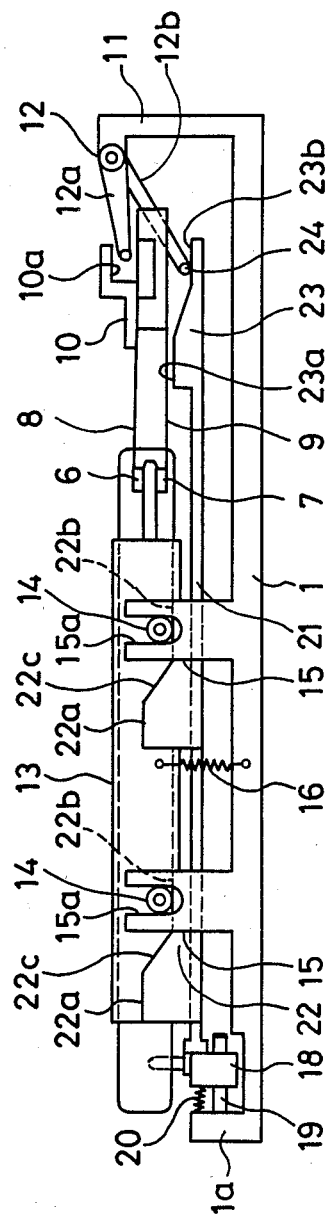

Referring initially to FIGS. 1 to 3, the disc drive arrangement of the invention generally comprises a chassis 1. A drive spindle 2 is rotatably provided at the front half portion (as viewed from left to right in FIG. 1) of the chassis 1 and a magnetic head mechanism arrangement 3 is provided at the rear half portion of the chassis 1.

The magnetic head mechanism arrangement 3 includes a carriage 4 movable in the right to left or front to rear direction in, for example, FIG. 1 and an upstanding head post 5 fixed to the carriage 4. The head post 5 supports a pair of upper and lower magnetic heads 6 and 7 through first and second gimbals or arms 8 and 9 which are fixed to the upstanding head post 5 so as to be extended forward. The first arm 8 carrying the upper head 6 is attached to the head post 5 to be moved up and down with resiliency and includes a platform 10 attached to the rear upper surface of the head post 5. The platform 10 includes an engaging portion 10a which is secured thereto and opened rearwardly. This platform 10 is moved up and down by a pushing elongated portion 12a of a bell-crank-shaped head lifter 12 which is pivoted to a bearing portion 11 secured to the rear portion of the chassis 1.

The disc drive arrangement of this invention further includes a cartridge mounting and positioning means 13. The cartridge mounting and positioning means 13 is a so-called cartridge holder which is located above the drive spindle 2 in the front half portion of the chassis 1 so as to be freely movable in the up and down direction. Specifically, the cartridge holder 13 includes rollers 14 pivoted to the front and rear portions of both side walls thereof. These rollers 14 are engaged with vertically-elongated guide grooves 15a of support members 15 at the front and rear positions of the front half portion (as viewed from left to right in FIGS. 1 to 3) of the chassis 1 so that the cartridge holder 13 can move up and down in parallel to the chassis 1. Coil springs 16 are extended between the chassis 1 and the cartridge holder 13 to urge the cartridge holder 13 toward the chassis 1 at all times.

The chassis 1 further includes an upstanding post 1a secured at one corner and in the front half portion thereof. A movable block 18 is slidably inserted into a guide shaft 19 extended from the upstanding post 1a rearward in the horizontal direction. A coil spring 20 is stretched between the upstanding post 1a and the movable block 18 to always bias the movable block 18 toward the rearward. The movable block 18 includes a pin 17 plated thereon upward which will release a disc pushing spring of a disc cartridge which will be described later.

A slide plate 21 is provided to be movable back and forth between the chassis 1 and the cartridge holder 13. The slide plate 21 includes cam members 22 at the front and rear portions of its both side walls in correspondence with the respective rollers 14 of the cartridge holder 13. Each of the cam members 22 includes a front high edge 22a and a rear low edge 22b corresponding to the up and down positions of the cartridge holder 13 and also a central inclined edge 22c. An arm member 21a is extended from one side of the rear portion of the slide plate 21. A rear cam member 23 is implanted on the rear end of the arm member 21a, and this rear cam member 23 includes a front high edge 23a and a rear low edge 23b to oppose through a roller 25 to an operating rod 24 connected to an elongated arm member 12b of the head lifter 12. The slide plate 21 further includes a pushing member 26 at its one front side portion in correspondence with the movable block 18.

To the rear portion of the thus arranged slide plate 21 is secured a female screw arm 27. This female screw arm 27 is screwed by a lead screw 28 that is rotatably supported at two positions in the front to rear direction of the chassis 1. The lead screw 28 is rotated through a reduction gear mechanism 29 by a loading motor 30. Thus, when the lead screw 28 is rotated by the motor 30, the slide plate 21 is moved back and forth through the female screw 27, i.e., in the forward or rearward direction in accordance with the rotational direction of the lead screw 28.

There is provided a stepper motor 31 (shown in phantom in FIG. 1) coupled with a spindle 31a around which a steel belt 32 fixed to the carriage 4 is wrapped. Then, the turning of the spindle 31a in the clockwise or counter-clockwise direction causes the carriage 4 to slide forwardly or rearwardly through the steel belt 32. Although the carriage 4 is provided with a means for fine moving the magnetic heads, such means is, however, not directly related to the present invention, and it may therefore not be shown and described.

Figure 4:
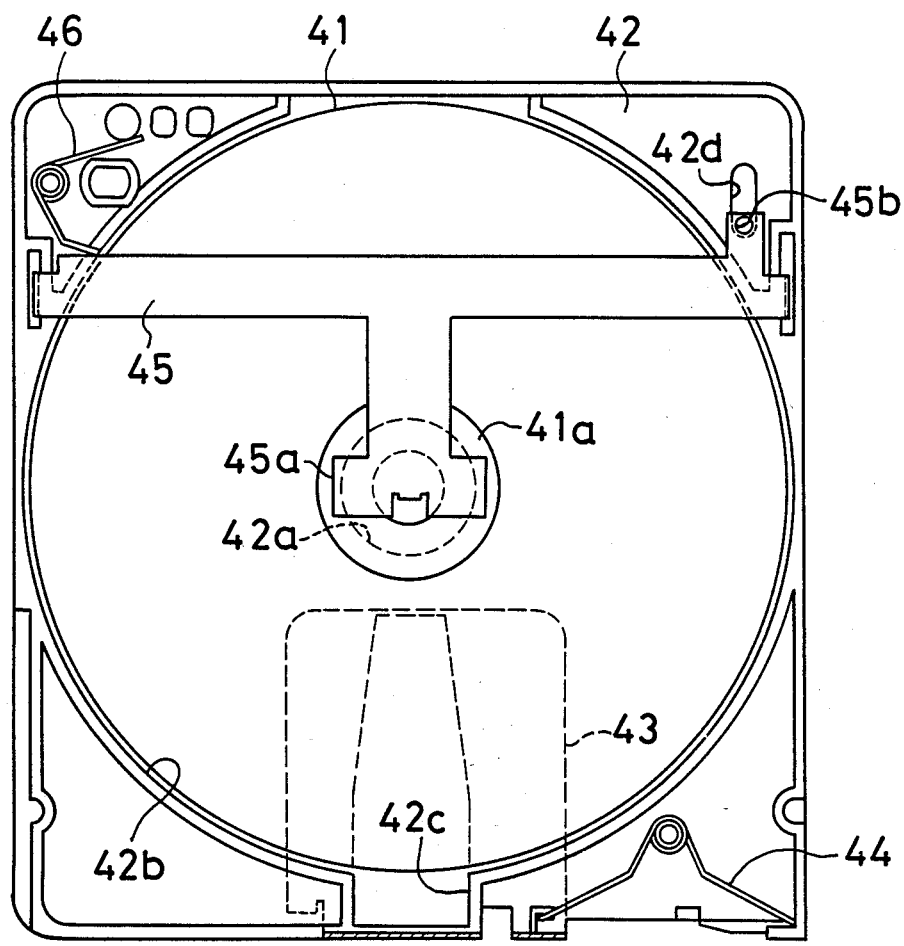
FIG. 4 is a plan view of an example of a disc cartridge used by the disc drive arrangement of the invention with the upper half thereof removed.
Figure 5:
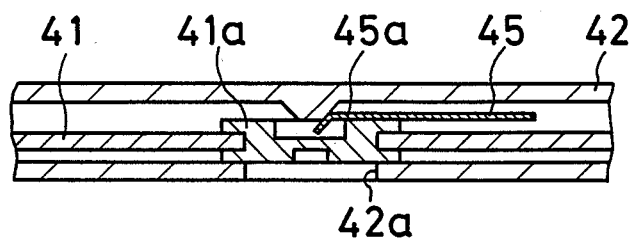
FIG. 5 is a cross-sectional view of a main portion of FIG. 4.

FIGS. 4 and 5 illustrate an example of a disc cartridge driven by the disc drive arrangement of the present invention. FIG. 4 is a plan view illustrating the disc cartridge retaining a disc with the upper half of the disc cartridge removed. FIG. 5 is a partially cross-sectional view of FIG. 4 wherein a magnetic disc in the cartridge is urgedly held.

Referring to FIGS. 4 and 5, there is shown a magnetic disc 41 having a center core 41a at the center thereof. It is to be understood that when the disc 41 is inserted into the disc drive arrangement of the invention, the magnetic head 6 can be placed adjacent the upper surface thereof and the magnetic head 7 can be placed adjacent the lower surface thereof so that the reading and writing can be accomplished on both sides of the disc 41. There is shown a cartridge 42 which retains therein the disc 41 on its disc table portion 42b formed therein. The form of the disc table portion 42b is circularly-concaved one and, at the center of the disc table portion 42b is bored an opening 42a through which will be inserted the drive spindle 2 (FIG. 1). Through the upper and lower halves of the cartridge 42 over both sides of the disc 41 there are formed windows 42c through which the magnetic heads 6 and 7 are inserted into the cartridge 42 for recording and reproduction. A shutter 43 is provided over both outsides of the cartridge 42 to open and close the windows 42c. A biasing member, for example, a spring 44 is provided in the cartridge 42 to always spring-bias this shutter 43 toward the direction to close the windows 42c.

The cartridge 42 incorporates therein a pushing member for urging the magnetic disc 41, for example, a pushing spring member 45 whose length is made enough to cross the retained disc 41 in its substantially diametrical direction. A spring tongue 45a is elongated from the center of the spring member 45 to urge the center core 41a, of the magnetic disc 41. The spring member 45 engages with the inner side walls of the cartridge 42 to be slidable in the front and rear direction. Also, the spring member 45 is spring-biased by a spring-biasing member 46 provided in the cartridge 42 so that the spring tongue 45a thereof is always urged against the center core 41a of the magnetic disc 41. The spring member 45 urges the magnetic disc 41 to one side of the cartridge 42 to thereby prevent the magnetic disc 41 from being unnecessarily moved within the cartridge 42. Further, the spring member 45 urges the center core 41a toward the opening 42a side. The spring member 45 has at one end an opening 45b with which is engaged the afore-mentioned releasing pin 17. The cartridge 42 has bore therethrough a rectangular slit 42d which is long in the front to rear direction at the position corresponding to the opening 45b and to which is inserted the pin 17 when the cartridge 42 is lowered.

The loading operation of the disc drive arrangement of the invention for the cartridge 42 with the disc 41 therein, that is, the disc cartridge is as follows.

Before the operation of the disc drive arrangement, as shown in FIG. 2, since the slide plate 21 is in its full rearward position, the cartridge holder 13 is lifted by the high edges 22a of the cams 22 through the rollers 14 and placed in its full upward position. Meanwhile, the high edge 23a of the rear cam 23 lifts the arm 12b of the head lifter 12 upwardly through the rod 24. Thus, the head lifter 12 is rotated in the upward direction causing the arm 12a to urge the first gimbal 8 of the upper magnetic head 6 upwardly through the head base 10, so that the upper magnetic head 6 is spaced apart from the lower magnetic head 7 considerably. Under this condition, the pushing member 26 is spaced apart from the movable member 18 with the releasing pin 17.

Next, the cartridge 42 is inserted into the cartridge holder 13. As the cartridge 42 is inserted into the cartridge holder 13, the shutter 43 for the cartridge 42 is pulled open. A member for opening the shutter 43 is not shown in FIG. 2. After the completion of the insertion of the cartridge 42 into the cartridge holder 13, the loading motor 30 is driven by the detected signal indicating this complete insertion to rotate the lead screw 28. Thus, the slide plate 21 is slid forwardly through the female screw 27. As the slide plate 21 is slid forwardly, each cam 22 comes in contact with each roller 14 of the cartridge holder 13 from its inclined edge 22c to the lower edge 22b. Thus, the cartridge holder 13 is lowered in cooperation of the biasing force of the tension coil spring 16, as shown in FIG. 3. Then, the cartridge 42 is carried above the drive spindle 2 and then the drive spindle 2 is inserted through the opening 42a into the cartridge 42 to be engaged with, or chuck the center core 41a of the magnetic disc 41 through the opening 42a. This chucking operation is carried out with a help of the biasing force of the spring member 45. Under this condition, the pin 17 is inserted through the rectangular slit 42d of the cartridge 42 to the opening 45b of the spring member 45.

Since the slide plate 21 keeps sliding forwardly even after the completion of the chucking operation, the pushing means 26 urges the movable member 18 forwardly so that the movable member 18 is moved forward against the biasing force of the compression coil spring 20, as shown in FIG. 3. As the movable block 18 is moved forwardly, the spring member 45 with the pin 17 engaged is slid forwardly and then the spring portion 45a comes away from the center core 41a of the magnetic disc 41, thus the magnetic disc 41 being released from the urging by the spring portion 45a of the spring member 45 to become freely rotatable.

During this operation, the lower edge 23b of the rear cam 23 comes in contact with the rod 24 so that the head lifter 12 is rotated in the downward direction to thereby release the head base 10 from the pushing-up by the pushing arm 12a. Thus, the upper magnetic head 6 is moved downwardly through the first gimbal 8 to get close to the lower magnetic head 7. That is, the upper magnetic head 6 contacts with the upper surface of the magnetic disc 41 through the window 42c of the cartridge 42. Meanwhile, the lower magnetic head 7 is brought in contact with the lower surface of the magnetic disc 41 when the magnetic disc 41 is chucked by the drive spindle 2.

At the completion of the above mentioned operations, the loading motor 30 is stopped and then the recording and/or reproduction of the magnetic disc 41 will start. The recording and/or reproduction operation will be carried out with the movement of the carriage 4 which carries thereon the upper and lower magnetic heads 6 and 7.

After the end of the recording and/or reproduction, the magnetic disc 41 is ejected. That is, the unloading operation is carried out by the eject operation, in which the loading motor 30 is reversely rotated, the slide plate 21 is moved rearwardly (from left to right in FIG. 3), and the above-mentioned operation is carried out in an opposite fashion to thereby lift up the cartridge holder 13 allowing ejecting the cartridge 42 from the cartridge holder 13.

According to the present invention, as set forth above, in the loading operation for loading the magnetic recording and/or reproducing disc retained in the cartridge and urged thereto by the pushing member, the single movable body can carry out the following three operations at a time in which the magnetic disc is chucked with and/or disengaged from the drive spindle with the upward and/or downward movement of the cartridge, the magnetic disc is released from the urging within the cartridge, and the upper and lower magnetic heads are brought in contact with the upper and lower surfaces of the magnetic disc. Thus, the disc drive arrangement of the invention can be simplified in construction and can be operated simply and positively.

It should be understood that the above description is presented by way of example on a single preferred embodiment of the invention and it will be apparent that many modifications and variations could be effected by one skilled in the art without departing from the spirit and scope of the novel concepts of the invention, so that the scope of the invention should be determined only by the appended claims.

I claim as my invention:

1. A disc drive arrangement for a disc rotatably retained in a cartridge, said cartridge having a head opening through which is inserted a magnetic head, a central opening through which is inserted a spindle and a locking means for locking said disc upon non-use, sad disc drive arrangement comprising:
   (a) cartridge holder means for holding said cartridge;
   (b) movable member means which will be slid by drive means after said cartridge is inserted into said cartridge holder means;
   (c) holder moving means provided on said movable member means and for moving said cartridge holder means upwardly and/or downwardly;
   (d) head moving means provided on said movable member means and for moving said head upwardly and/or downwardly relative to said disc; and
   (e) disc lock releasing means responding to said movable member means to release said locking means of said disc, wherein while said movable member means is slid by said drive means, upward and/or downward movements of said cartridge, upward and/or downward movements of said magnetic head and the releasing and/or locking of said disc locking means are carried out at a predetermined timing successively.

2. The disc drive arrangement of claim 1, wherein said movable member means is formed of a flat plate.

3. The disc drive arrangement of claim 2, wherein said movable member means formed of the flat plate is provided with tapered cam pieces for said cartridge holder means and said head moving means, respectively.

4. The disc drive arrangement of claim 1, wherein said disc lock releasing means is formed of a movable block, a releasing pin implanted on said movable block, a guide rod and a compression coil spring for always biasing said movable block to one side so as to be movable in the horizontal direction.

5. The disc drive arrangement of claim 1, wherein said head moving means is formed of a head base moving means, an operating rod movable in response to movement of said head moving means and a bell-crank-shaped head lifter supported by a bearing secured to the rear side of a chassis, one end of said operating rod being coupled to one end of said head moving means, an arm of said head moving means coming in contact with said head base.

6. The disc drive arrangement of claim 1, wherein said drive means is formed of a drive motor, a lead screw rotated by said motor and a female screw arm secured to said movable member means and screwed to said lead screw.

* * * * *